July 14, 1936.  E. W. WORK  2,047,722
PRESSURE, TEMPERATURE, AND VACUUM RELIEF VALVE
Filed Jan. 15, 1935
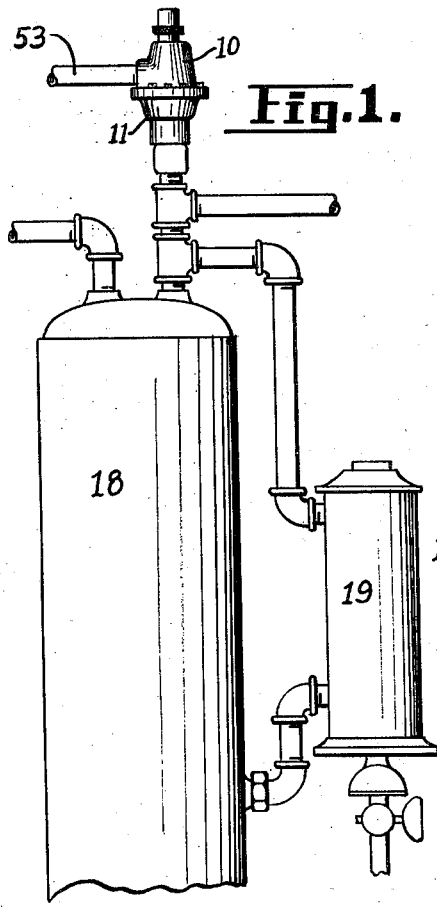
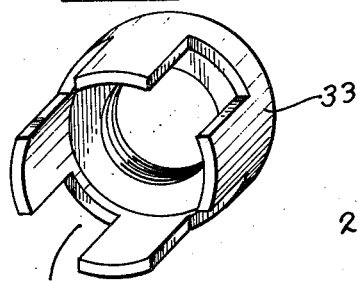
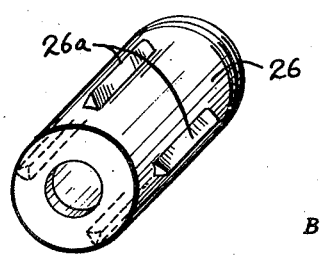
INVENTOR
Ernest W. Work.
BY H. G. Manning
ATTORNEY Patented July 14, 1936

2,047,722

UNITED STATES PATENT OFFICE 2,047,722

PRESSURE, TEMPERATURE, AND VACUUM RELIEF VALVE

Ernest W. Work, Toronto, Ontario, Canada, assignor to The Beaton & Cadwell Manufacturing Company, New Britain, Conn., a corporation of Connecticut Application January 15, 1935, Serial No. 1,849

21 Claims. (Cl. 137—53)

This invention relates to valves, and more particularly to a relief valve for use in a liquid heating system, such as a domestic hot-water supply system.

One object of this invention is to provide a relief valve of the above nature having a single pair of contacting valve members which are adapted to be separated whenever excessive pressure, heat, or vacuum conditions develop within the system.

A further object is to provide a relief valve of the above nature in which the valve will be opened by the excessive pressure in the system by means of a flexible diaphragm of large effective area, thus insuring positive and accurate operation thereof.

A further object is to provide a relief valve of the above nature in which the single valve is operated independently by a pressure-responsive flexible diaphragm, a temperature-responsive bellows, and a vacum-responsive housing member in communication with the outer atmosphere.

A further object is to provide a valve in which the pressure relief member and temperature operated bellows may be adjusted without the use of special tools and without interfering with the operation of the valve or removing it from the system.

A further object is to provide a valve of the above nature which will be simple in construction, inexpensive to manufacture, easy to install and manipulate, compact, and very efficient and durable in use.

With these and other objects in view, there has been illustrated on the accompanying drawing, one form in which the invention may be conveniently embodied in practice.

In the drawing:

Fig. 1 represents a conventional hot water supply boiler, to which the improved relief valve has been attached.

Fig. 2 is a vertical sectional view of the valve unit per se.

Fig. 3 is a detail perspective view of the stool member for supporting the diaphragm and upper tubular valve member.

Fig. 4 is a detail perspective view of the movable housing for the thermostatic bellows.

In previous relief devices for liquid heating systems, it has been customary to employ separate valves for relieving the excess pressure, temperature, and vacuum. Such devices were quite complicated and would often fail to function properly because of sticking of the valves due to corrosion or other causes.

By means of the present invention, the above and other disadvantages have been eliminated. This has been accomplished by providing a single valve carried by a pressure actuated diaphragm adapted to be raised by excess pressure in the system, and a movable valve seat adapted to be lowered by a housing containing a thermostatic bellows operated by the development either of excess temperature or vacuum within the system.

Referring now to the drawing in which like reference numerals denote corresponding parts throughout the several views, the improved relief valve is herein shown as comprising a two-part casing including an upper cover member 10 and a lower body member 11 secured together, as by screws 12, engaging in the abutted flanged edges 13, 14 of said cover and body, respectively.

A flexible member or diaphragm 15 forms a partition across the middle part of the casing and is tightly clamped between the flanges 13 and 14 of the cover 10 and body 11, thus dividing the interior of the casing into an upper compartment A and a lower compartment B, the former being open to the atmosphere and the latter being connected to the liquid system.

The lower body member 11 is provided with a depending tubular boss 16 exteriorly threaded at 17, by means of which the relief valve may be connected to the top of a domestic hot water boiler 18 having a gas-operated heating coil 19 piped thereto, as shown in Fig. 1. The liquid is adapted to pass from the boiler 18 to the body 11 of the relief device through an annular passage 20 in the boss 16 surrounding a hollow tube 21, which is joined to a thermostatic bellows 22, to be described later.

The body member 11 is formed in two sections, a lower cylindrical section 23, and an upper inverted frusto-conical section 24, an intermediate interior annular shoulder 25 being formed therebetween. A hollow cylindrical housing 26 is slidably mounted within the cylindrical body 23, and is spaced therefrom by means of a plurality of projecting fins 26a which loosely engage the interior cylindrical wall of the body 23 and provide a passage for the free flow of liquid upwardly thereby.

The center of the diaphragm 15 is provided with an opening in which is located a vertically movable tubular valve member 27 having a central port 28 and a depending annular rim 29, which is normally adapted to seat tightly against a valve disc 30, preferably made of relatively soft composition material. The tubular valve member 27 is provided with a side flange 31 adapted to seat upon the diaphragm 15.

Below the flange 31 the valve member 27 is threaded to correspond with the interior threads of the tapped upper end of an inverted cup-shaped stool member 33. The lower open end of the stool member 33 is adapted to rest upon the shoulder 25 of the lower body member 11 and serves to limit the downward movement of the diaphragm 15 and the tubular valve member 27. As most clearly shown in Fig. 3, the lower cylindrical end of the stool member 33 is provided with a plurality of slots 34 for permitting the free circulation of liquid throughout the chamber B.

The valve disc 30 is carried by a supporting plate 35, the outer edge of which rests upon the upper edge of the movable housing 26. The valve disc 30 and its supporting plate 35 are held tightly upon the end of the housing 26 by means of a tapped flanged ring 36 having threaded engagement with the upper end of said housing 26.

The tubular valve member 27 is pressed downwardly to cause the stool member 33 to engage the shoulder 25 by a relatively strong helical spring 37 located in the chamber A, the lower end of said spring abutting against the flange 31 of the tubular valve member 27, the upper end of said spring engaging against a thrust plate 38. The thrust plate 38 in turn is abutted against a threaded tubular sleeve 39 screwed at its upper end into an upwardly extending tapped boss 40 forming part of the cover 10. The upper end of the threaded sleeve 39 is provided with slots or kerfs 41 for facilitating the movement of said sleeve whenever it is desired to change the tension of the spring 37.

At the point where the upper part of the hollow tube 21 is connected to the bellows 22, said tube is joined by a liquid-tight connection, as by solder, to the base of the housing 26, through which said tube passes. By means of this construction, the fluid in the tube 21 will be maintained in intimate association with the liquid in the heating system at all times. This will cause the bellows to expand rapidly whenever the temperature of said liquid exceeds the predetermined safe limit.

A vertical pin 42 is integrally connected with the upper end of the bellows 22 and passes slidably through the plate 35 and the valve disc 30. The vertical pin 42 has its upper end in engagement with the pointed reduced end 43 of a stop pin 44 located in vertical alinement with the thermostat unit and slidably mounted in the tubular adjusting bushing 39. The upper end of the stop pin 44 is provided with a reduced section 45 forming a shoulder 46 which is adapted to engage against the flanged lower end 47 of an adjusting screw 48 threadedly engaged in a plug member 49 screwed tightly into the upper tapped boss 40 of the cover 10.

The reduced section 45 of the stop pin 44 extends upwardly a slight distance beyond the adjusting screw 48 (see Fig. 2), so that the pin 44 may be pressed manually downwardly occasionally for testing the relief valve or for cleansing the valve contacting surfaces. The upper ends of the pin 45 and the adjusting screw 48 may be protected by means of a cap 50 having threaded connection with the plug member 49 and having liquid-tight connection therewith by means of a packing washer 51.

The side of the cover member 10 is provided with a tapped boss 52 to which a drain pipe 53 may be connected to allow the released liquid to flow out of the chamber A whenever the tubular valve member 27 separates from the valve disc 30.

The housing 26 containing the thermostatic bellows 22 is pressed upwardly by the liquid and also by means of a relatively light spring 54 engaging the lower end of the fins 26a. The housing 26 is arrested in its upward travel at a predetermined position by means of a split stop ring 55 located in an annular groove 56 positioned adjacent the shoulder 25 of the body member 11. As shown in Fig. 2, when the valve is in its normal closed position, the upper ends of the fins 26a will be slightly spaced from the stop ring 54 and will not engage therewith until the pressure in the system deflects the diaphragm and housing upwardly. A second light spring 57 is preferably located in the upper part of the housing 26 to press downwardly upon the bellows 22.

*Operation*

In the operation of the relief valve device, the pressure of the liquid in the heating system will normally maintain the valve disc 30 seated against the tubular valve member 27 and prevent liquid from escaping from the chamber B. The diaphragm 15 and attached tubular valve member 27 will remain normally in the position shown in Fig. 2.

Whenever the pressure within the liquid heating system rises above the predetermined safe limit, the flexible diaphragm 15, together with the tubular valve member 27, will move upwardly. The housing 26 carrying the valve disc 30 will follow this movement of the tubular member 27 for a short distance, until stopped by the engagement of the guiding fins 26a with the stop ring 55.

Further upward movement of the diaphragm and tubular valve member 27 will cause the latter to separate from the valve disc 30, permitting liquid to flow upwardly through the central port 28 of the tubular valve member 27 and thence escape into the chamber A, from which it will pass out through the drain pipe 53.

Whenever the temperature in the liquid heating system becomes excessive, the thermostatic bellows 22 will expand within the housing 26 and force the vertical pin 42 upwardly through the center of the valve disc 30 and the tubular valve member 27, causing the stop pin 44 to move with it until the shoulder 46 on the latter pin engages the flanged end 47 of the adjustable stop screw 48. Further movement upwardly of the bellows will thus be arrested, and further expansion of said bellows will cause the housing 26 to move downwardly separating the valve disc 30 from the tubular valve member 27.

Should for any reason a dangerous vacuum occur in the system, the housing 26 will be pushed downwardly against the light spring 54 by the atmospheric pressure acting through the drain pipe 53 and tubular valve member 27, causing the disc 30 to separate from the tubular valve member 27 and permit air to enter the system through the lower chamber B.

The pressure at which the relief valve will operate is governed by adjusting the tension of the heavy spring 37. This may be done by removing the plug 49 and cap 50, and screwing the adjusting sleeve 39 to the desired position without interfering with the adjustment of the thermostatic release in any way.

The temperature at which the relief will occur can be easily controlled by means of the adjusting stop screw 48 which may be manipulated without special tools by merely removing the cap 50, it being unnecessary to remove the valve from the heating system, or to interrupt the operation of the relief valve in any way.

One advantage of the present invention is that the relief valve unit possesses only a single pair of separable valve contacts, and that said valve is capable of releasing liquid from the system independently in case of the development either of a dangerous pressure, temperature, or vacuum condition.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a combination valve for relieving excessive pressure, temperature, and vacuum conditions in a liquid heating system, a casing, a diaphragm dividing said casing into two compartments, a single valve for controlling the communication between said compartments, and means for opening said valve in case of the development of an excess of either pressure, temperature or vacuum within said system.

2. In a combination pressure, temperature, and vacuum relief valve, a casing, a flexible diaphragm dividing said casing into two compartments, one of which is connected to the atmosphere and the other being connected to a liquid heating system, a liquid release valve member mounted on said diaphragm and movable therewith, means for opening said valve in case of an excessive increase of pressure in said system, means for opening said valve in case of excessive increase of temperature of the liquid in said system, and means for opening said valve in case an excessive vacuum is created in said system.

3. In a liquid relief apparatus, a casing, a flexible diaphragm dividing said casing into two compartments, the upper compartment being connected to the atmosphere and the lower to a liquid system, a valve contact mounted on said diaphragm, a valve disc slidably mounted for limited upward movement in said casing and adapted to engage said contact, an adjustable spring for pressing downwardly upon said valve contact, said disc being pressed upwardly by the liquid, means for unseating said valve contact upwardly from said disc in response to an excessive pressure in said system, and means for unseating said valve disc downwardly from said contact in response to either excessive temperature or excessive vacuum in said system.

4. In a relief valve for a liquid system, a casing, a single valve unit dividing said casing into two compartments, and means for opening said valve unit to relieve said system independently by the development either of excessive pressure, temperature or vacuum conditions.

5. In a relief valve for a liquid system, a casing, a single valve unit dividing said casing into two compartments, means for opening said valve unit to relieve said system independently by the development either of excessive pressure, temperature or vacuum conditions, said valve unit comprising a pair of separable contacts, one of said contacts being movable to open position by the action of excessive pressure, and the other of said contacts being movable to open position in response either to excess temperature or excess vacuum conditions.

6. In a relief valve for a liquid system, a casing, a single valve unit dividing said casing into two compartments, means for opening said valve unit to relieve said system independently by the development either of excessive pressure, temperature or vacuum conditions, said valve unit comprising a pair of separable contacts, one of said contacts being movable upwardly to open position by the action of excessive pressure, and the other of said contacts being movable downwardly to open position in response either to excess temperature or excess vacuum conditions.

7. In a relief valve for a liquid system, a casing, a flexible diaphragm dividing said casing into two compartments, a tubular valve member carried by said diaphragm, a valve disc engaging said tubular valve member, a stool member supported within said casing for limiting the downward movement of said tubular valve member, and means for forcing said valve disc downwardly out of engagement with said tubular valve member in response either to excess temperature or vacuum conditions, the lower side of said diaphragm being subject to the pressure of the liquid system at all times.

8. In a relief valve for a liquid system, a casing, a flexible diaphragm dividing said casing into two compartments, an adjustably spring-pressed tubular valve member carried by said diaphragm, a valve disc engaging said tubular valve member, a stool member supported within said casing for limiting the downward movement of said tubular valve member, and means for forcing said valve disc downwardly out of engagement with said tubular valve member in response to either excess temperature or vacuum conditions, the lower side of said diaphragm being in direct communication with the liquid system at all times.

9. In a relief valve for a liquid system, a casing, a flexible diaphragm dviding said casing into two compartments, a tubular valve member carried by said diaphragm, a spring-pressed valve disc engaging said tubular valve member, a stool member supported within said casing for limiting the downward movement of said tubular valve member, and means for forcing said valve disc downwardly out of engagement with said tubular valve member in response to either excess temperature or vacuum conditions, the lower side of said diaphragm being subject to the pressure of the liquid system at all times.

10. In a relief valve for a liquid system, a casing, a flexible diaphragm dividing said casing into two compartments, a tubular valve member carried by said diaphragm, a movably mounted valve disc engaging said tubular valve member, means carried by said tubular valve member for preventing downward movement thereof, means for limiting the upward movement of said disc, said diaphragm and tubular valve member being movable upwardly to open position in response to excess pressure, thermostatic means associated with said disc to move said disc down to open position in response to excessive temperature conditions, and said disc being independently movable downwardly to open position in response to excessive vacuum conditions, the lower side of said diaphragm being subject to the pressure of the liquid system at all times.

11. In a relief valve for a liquid system, a casing, a flexible diaphragm dividing said casing into two compartments, a tubular valve member carried by said diaphragm, a movably mounted valve disc engaging said tubular valve member, means for preventing downward movement thereof, means for limiting the upward movement of said disc, said diaphragm and tubular valve member being movable upwardly to open position in response to excess pressure, thermostatic means associated with said disc to move said disc down to open position in response to excessive temperature conditions, and said disc being independently movable downwardly to open position in response to excessive vacuum conditions, the lower side of said diaphragm being subject to the pressure of the liquid system at all times.

12. In a relief valve for a liquid system, a casing having a shoulder and an inner stop ring, a single valve unit comprising a tubular valve member and a valve disc for engaging each other, a stool member having engagement with said shoulder to limit the downward movement of said tubular valve member, a housing carrying said disc and having engagement with said stop ring to limit the upward movement of said disc, said tubular valve member being movable upwardly to unseated position in response to excess pressure in the system, said disc being movable downwardly to unseated position in response to the pressure of the surrounding atmosphere acting through said tubular valve member in case of excessive vacuum conditions within the system.

13. In a relief valve for a liquid system, a casing, a single valve unit dividing said casing into two compartments, the upper compartment having a connection to a drain, the lower compartment being connected to the liquid system, said unit comprising an upper tubular valve member and a lower valve disc normally in closing engagement with each other, means responsive to excess pressure in the liquid system to raise said tubular valve member to open position for releasing liquid therefrom, thermostatic means responsive to excess temperature in said system to depress said disc to open position, and independently acting means responsive to atmospheric pressure acting on said disc through said drain and tubular valve member to depress said disc to open position in case of excessive vacuum conditions within said system.

14. A relief valve as specified in claim 13 in which the movable part of said thermostatic means is exposed to atmospheric pressure.

15. In a relief valve for a liquid system, a casing, a single valve unit dividing said casing into two compartments, the upper compartment having a connection to a drain, the lower compartment being connected to the liquid system, said unit comprising an upper tubular valve member and a lower valve disc normally in closing engagement with each other, means responsive to excess pressure in the liquid system to raise said tubular valve member to open position for releasing liquid therefrom, thermostatic means responsive to excess temperature in said system to depress said disc to open position, independent means responsive to atmospheric pressure acting on said disc through said drain and tubular valve member to depress said disc to open position in case of excessive vacuum conditions in said system, means secured to said thermostatic means passing up through said disc and said tubular valve member, an adjustable pin carried by the upper part of said casing for limiting the upward movement of said upwardly passing means and causing the expansion of said thermostatic means to depress said disc and open the valve.

16. In a relief apparatus for a liquid system, a casing connected to said system, a single valve in said casing, means for opening said valve independently in response either to excessive pressure, temperature or vacuum conditions in said system, means for causing said valve to open in the direction of flow of the liquid being released when operated by pressure and to open in the opposite direction when operated by temperature or vacuum.

17. In a liquid relief apparatus, a casing having a flexible diaphragm dividing it into two compartments, means for connecting one compartment to a liquid system so that said diaphragm will be constantly subjected on one side to the pressure of the liquid, a tubular valve member mounted in said diaphragm and being capable of movement in the upper compartment only, a flat valve disc subjected to the pressure of said liquid and engaging the underside of said tubular valve member, means responsive to excess pressure to unseat said tubular valve member upwardly, and means responsive to either excess temperature or vacuum to independently unseat said disc downwardly.

18. In a liquid relief apparatus, a casing having connections to a liquid system and a drain, a single valve unit in said casing between said connections and comprising a pair of movable contacting valve members, means for carrying the lower valve member comprising a housing slidably mounted in said casing, a thermostatic member enclosed in said housing and penetrating into the liquid system, the upper valve member being capable of movement upwardly in response to the development of excess pressure in the system, and said lower valve member being movable downwardly in response to excess temperature conditions.

19. In a liquid relief apparatus, a casing having connections to a liquid system and a drain, a single valve unit in said casing between said connections and comprising a pair of movable contacting valve members, means for carrying the lower valve member comprising a housing slidably mounted in said casing, a thermostatic member enclosed in said housing and penetrating into the liquid system, the upper valve member being capable of movement upwardly in response to the development of excess pressure in the system, and said lower valve member being movable downwardly in response to excess temperature conditions, said casing having an adjustable movable stop for limiting the travel of said thermostatic member upwardly away from its housing and causing it to expand downwardly to open the valve.

20. In a liquid relief apparatus, a casing having connections to a liquid system and a drain, a single valve unit in said casing between said connections and comprising a pair of movable contacting valve members, means for carrying the lower valve member comprising a housing slidably mounted in said casing, a bellows-type thermostatic member enclosed in said housing and penetrating into the liquid system, the upper valve member being capable of movement upwardly in response to the development of excess pressure in the system, and said lower valve member being movable downwardly in response to excess temperature conditions.

21. In a liquid relief apparatus, a casing having connections with a liquid system and a drain, a single valve unit in said casing between said connections, said unit comprising upper and lower movable contacting valve members, said lower valve member being limited in its upward movement and having a thermostatic member connected thereto, and means outside said casing for permitting manual adjustment of the point of thermostatic relief without interference with the normal operation of said apparatus or detaching it from said system.

ERNEST W. WORK.